United States Patent [19]

Satomi

[11] Patent Number: 4,771,315
[45] Date of Patent: Sep. 13, 1988

[54] DRIVE DEVICE FOR TRAVEL ASSEMBLY

[75] Inventor: Toyokazu Satomi, Yokohama, Japan

[73] Assignee: Ricoh Company, Ltd., Tokyo, Japan

[21] Appl. No.: 943,330

[22] Filed: Dec. 19, 1986

[30] Foreign Application Priority Data

Dec. 28, 1985 [JP] Japan .................... 60-203139[U]

[51] Int. Cl.⁴ .................... G03G 15/04; G03G 21/00
[52] U.S. Cl. ........................... 355/8; 355/3 R
[58] Field of Search .................. 355/3 R, 8, 55, 67

[56] References Cited

U.S. PATENT DOCUMENTS

| | | |
|---|---|---|
| 3,918,806 | 11/1975 | Cook .................... 355/8 |
| 4,155,641 | 5/1979 | Sagara et al. ............ 355/8 |
| 4,171,901 | 10/1979 | Takizawa et al. .......... 355/8 |
| 4,218,127 | 8/1980 | Costanza et al. .......... 355/8 |
| 4,355,883 | 10/1982 | Landa .................... 355/8 |
| 4,460,268 | 7/1984 | Forrester ................ 355/8 |

Primary Examiner—Fred L. Braun
Attorney, Agent, or Firm—Oblon, Fisher, Spivak, McClelland & Maier

[57] ABSTRACT

A drive device for a travel assembly for use in an optical system of an image read scanner, a printer head, etc. The drive device includes a wire rope for driving the travel assembly at each side thereof, one end of each wire rope being fastened to the travel assembly through a spring and a one-way clutch. This one-way clutch is so designed that it cannot rotate when the wire rope is tight for driving the travel assembly, which results in no fluctuation in motion of the travel assembly caused by an elongation or contraction of the spring. The one-way clutch can rotate for permitting the spring to absorb the aforesaid elongation or sagging of the wire rope only while the travel assembly is at rest.

11 Claims, 2 Drawing Sheets

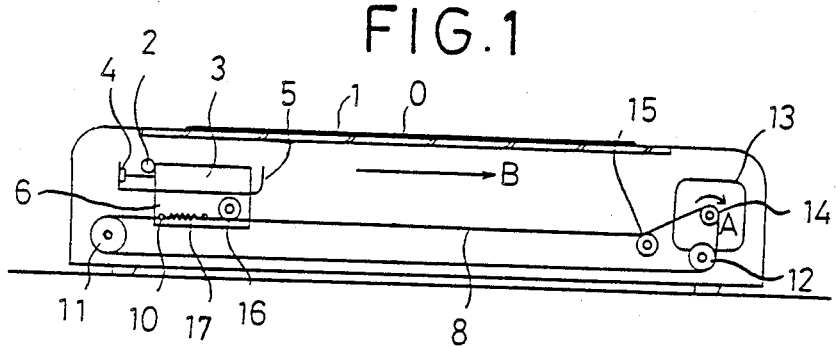
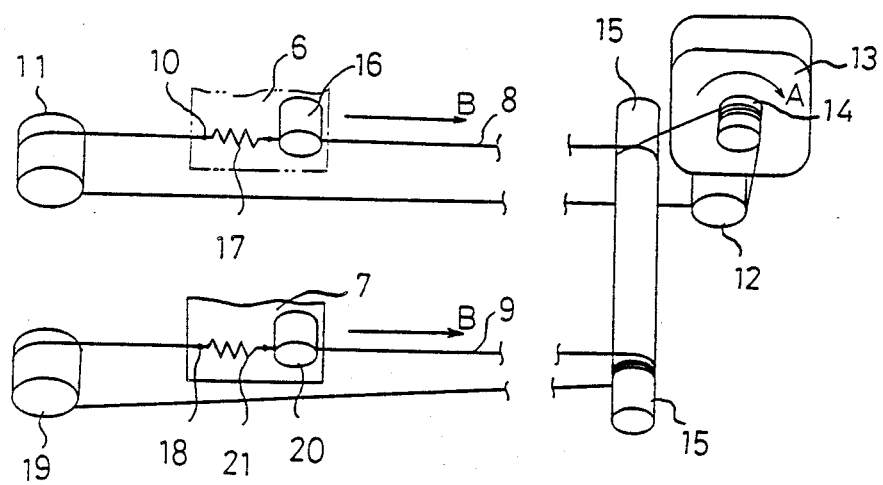

DRIVE DEVICE FOR TRAVEL ASSEMBLY

FIELD OF THE INVENTION

This invention relates to a drive device for a travel assembly which reciprocates along guide shafts and has a reversible motor to drive the travel assembly. A plurality of pulleys including a drive pulley are attached to a drive shaft of the motor, and wire ropes are trained over the pulleys as well as connected to the travel assembly.

BACKGROUND OF THE INVENTION

Drive devices for a travel assembly are used in travel assemblies for an optical system of an image read scanner, a printer head, etc. Normally, a travel assembly has a driver side driven by a driving rope at one side and a follower side following the driver side at the other side when viewed from a travel direction. The driver side is supported by two bearings spaced along the travel direction, and the follower side is supported by one bearing. Therefore, each time the travel assembly starts or stops, the follower side cannot follow the start or stop movement because of bearing play of the driver side, resulting in its delayed movement, which may cause loss of reading or twice reading in reading an original and, with a mirror travel assembly in a copying machine, may cause irregular movements, thus introducing jittering in the travel direction.

On the other hand, a drive device for an optical scan system has been proposed for a copying machine which intends to eliminate the aforesaid drawback by applying driving forces to both sides of a travel assembly. This proposal, however, necessitates a longer wire rope because both sides share the rope, which results in a larger diameter of rope and a stronger spring in use for applying tension, thus causing complicated construction of drive device.

Furthermore, a wire-type drive device has been well known for a travel assembly in which driving forces are applied on both sides of a travel assembly in the same way as above described, but the aforesaid long wire rope is divided into two short separate ropes to drive respectively both sides of a travel assembly. Engaged with either side of a travel assembly through an independent tension spring which tends to expand and contract depending on forces applied in scan movements of the travel assembly, each wire rope causes irregular motion of the travel assembly.

OBJECT OF THE INVENTION

It is the object and purpose of the invention to provide a drive device for a travel assembly which eliminates the drawbacks of the prior art.

SUMMARY OF THE INVENTION

In a drive device for a travel assembly, the aforesaid object can be accomplished by providing two wire ropes respectively on both sides of the travel assembly. A first wire rope for one side is fastened to the travel assembly with one end directly and with the other end through a turn pulley, a drive pulley, an intermediate pulley, a one-way clutch on the travel assembly, and a spring. The second wire rope for the other side is fastened to the travel assembly with one end directly and with the other end through a turn pulley, an intermediate pulley, a one-way clutch on the travel assembly, and a spring.

In a drive device for a travel assembly according to the invention with springs in a driving system to absorb the elongation or sagging of wire ropes, the aforesaid configuration can cut off spring action while the travel assembly is in motion, thus realizing a stable operation without being affected by expansion or contraction of the springs.

BRIEF DESCRIPTION OF DRAWINGS

In the accompanying drawings, there are shown illustrative embodiments of the invention from which these and other of its objectives, novel features, and advantages will be readily apparent.

In the drawings:

FIG. 1 is a sketch showing an image read scanner for which this invention is adapted.

FIG. 2 is a perspective view showing main components of the invention.

Figure 3:
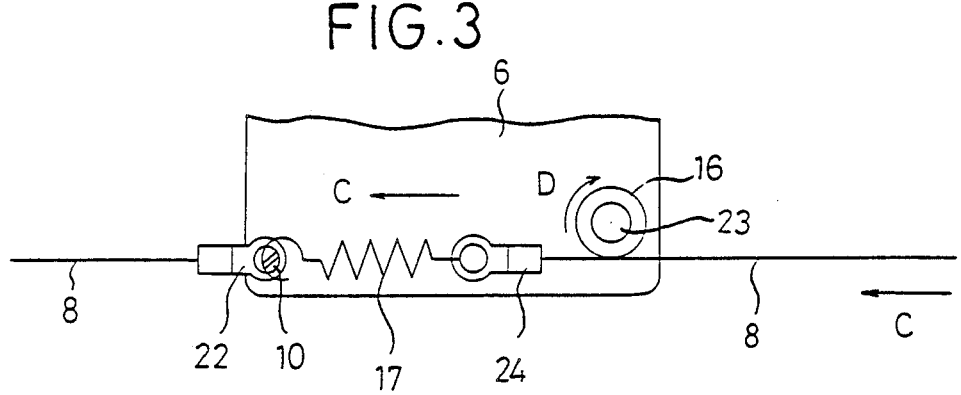
FIG. 3 is a detailed view showing first embodiment of the invention, in which a wire rope is connected to a down section of a travel assembly.

DETAILED DESCRIPTION OF THE PREFERRED EMBODIMENTS in FIG. 1, an original 0 is placed on an original glass plate 1 to be illuminated with a lamp 2. Reflected beams from the original 0 are projected and image-formed on an equal-size sensor 4 through an equal-size optical system 3 such as RMLA (trade name). The lamp 2, the equal-size optical system 3, and the equal-size sensor 4 are all integrally held on a travel assembly 5, which is slidably supported by guide shafts (not shown) through bearings.

The travel assembly 5 is equipped with a first down section 6 and a second down section 7 (FIG. 2) respectively on both sides transversely to a travel direction thereof, and both ends of a first wire rope 8 and a second wire rope 9 disposed respectively on both sides of the travel assembly 5 are engaged respectively with the aforesaid down sections. The first rope 8 is fastened at one end thereof to the travel assembly 5 with screw 10. The first rope 8 is looped on a left turn pulley 11, next on a right turn pulley 12, then on a drive pulley 14 fixedly secured on a drive shaft of a reversible motor 13 with two or three complete circular loops, on an intermediate pulley 15 with one or more loops, and finally the other far end thereof reaches back to the first down section 6 of the travel assembly 5.

The second wire rope 9, as shown in FIG. 2, is fastened at one end thereof to the second down section 7 of the travel assembly 5 with screw 18. The second rope 9 is looped on a left turn pulley 19, next on the intermediate pulley 15 with two or three complete circular loops, and finally the other far end thereof reaches back to the second down section 7 of the travel assembly 5. Embodiments of the engagement of the first and second wire ropes 8, 9 with the first and second down sections 6, 7 are detailed later.

As shown in FIG. 2, the intermediate pulley 15 is shared with the first rope 8 and the second rope 9. The intermediate pulley 15 is rotated by the first rope 8, which is a driver rope, and transmits the driving force thereof to the second rope 9, which is a follower rope.

The First Embodiment

In FIG. 3, one end of the first rope 8 is engaged with the screw 10 (screwed into the first down section 6) through a wire terminal 22 fastened to the rope. The other end of the first rope 8 is engaged with a spring 17 through a wire terminal 24 fastened to the other end of the first rope 8, after being looped with a one or more complete circular loops around a one-way clutch 16 disposed at the first down section 6 through a shaft 23. The other end of the spring 17 is fastened to the screw 10. The spring 17 is so designed as to pull the other end of the first rope 8 toward direction C at all times. Thus, if the first rope 8 elongates or sags, the spring 17 will absorb the elongation or sagging by contraction thereof as described later. It is normally advisable that tension force of the spring 17 be one to five kgs.

The one-way clutch 16 can rotate only in a direction D (in FIG. 3) about the shaft 23 so that the spring 17 can absorb an elongation or sagging of wire rope, but not rotate in a direction reverse to D because of engagement of the clutch with the shaft 23.

The embodiment of the engagement of the second wire rope 9 with the second down section 7 using the screw 18, a one-way clutch 20, and a spring 21 is similar to the aforesaid embodiment of engagement of the first wire rope 8 with the first down section 6.

The operation of the aforesaid device is described as follows, particularly for the driver side (although nearly similar to the follower side).

The reversible motor 13 rotates in a direction A (FIGS. 1 and 2) for scan reading. First, drive pulley 14 takes up the first wire rope 8 in the same direction, which moves the travel assembly 5 in the direction B through the intermediate pulley 15. At the same time, the intermediate pulley 15 takes up the second wire rope 9 looped on the other far end thereof, which pulls the second down section 7 in the same direction B, thus allowing both sides of the travel assembly to move at the same speed in the direction B.

When the travel assembly is moving in the aforesaid direction B, the one-way clutch 16 tends to slip in a direction reverse to D by the tension force of the first rope 8, but the aforesaid tension is blocked by the shaft 23 of the one-way clutch 16, because the one-way clutch 16 cannot rotate in this direction, so that the tension force does not reach to the spring 17. In other words, while the travel assembly 5 is running for scan reading, the action of the spring 17 would not reach to the first rope 8.

In FIG. 1, when the motor 13 is turned around in the opposite direction to A, a part of the wire rope 8 ranging from the drive pulley 14 through the right and left turn pulleys 12 and 11 to the screw 10 becomes tension side. Besides, another part of the first wire rope 8 from the one-way clutch 16 to the intermediate pulley 15 becomes tension side as well, because the intermediate pulley 15 drives the second down section 7. Therefore, the one-way clutch 16 cannot turn around while keeping engagement with the shaft 23, which keeps the tension force of the first rope 8 from applying to the spring 17. Thus, although the driving system includes an elastic spring, spring action does not work in the system while the travel assembly 5 is moving in either direction, resulting in no fluctuation in motion of the travel assembly caused by an elongation or contraction of the spring.

If the first wire rope 8 elongates or sags while the travel assembly is in motion or at rest, the spring 17 pulls tight the first rope 8 after the travel assembly has come to rest, when the one-way clutch 16 tends to rotate in the direction D as shown in FIG. 3, thus permitting the spring 17 to absorb the aforesaid elongation or sagging of the first wire rope 8.

The Second Embodiment

In FIG. 2, when a part of the first rope 8 ranging from the screw 10 through the left and right turn pulleys 11 and 12 to the drive pulley 14 elongates or sags, it is expected that the elongation or sagging won't be soon absorbed by the spring 17, because the spring 17 is far away from the aforesaid part of the first rope 8. A solution for this concern is shown in FIG. 4.

Figure 4:
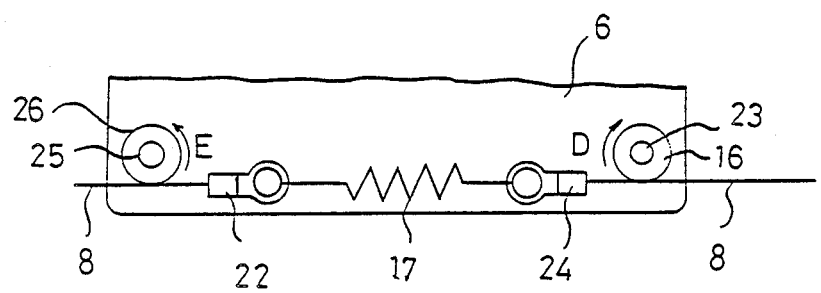
FIG. 4 is a detailed view showing a second embodiment of the invention, in which the wire rope shown in FIG. 3 is connected to the down section.

In FIG. 4, in place of the screw 10 in FIG. 3, a separate one-way clutch 26 is provided on the first down section 6 through a shaft 25, and one end of the first wire rope 8 is fastened to the spring 17 through the wire terminal 22 fixed thereto after the first rope 8 is looped on the one-way clutch 26 with one or more complete circular loops. The one-way clutch 26 is so designed as to rotate in a direction E, but to be unable to rotate in the direction opposite to E. Therefore, when the aforesaid part of the first rope 8 becomes tension side, the one-way clutch 26 does not rotate. On the other hand, when the first rope 8 elongates or sags while the travel assembly 5 is at rest, the spring 17 absorbs the elongation or sagging. In the embodiment shown in FIG. 4, only one spring 17 is used to fasten either side of the first rope 8, but two separate springs may be used instead of one.

The Third Embodiment

Figure 5:
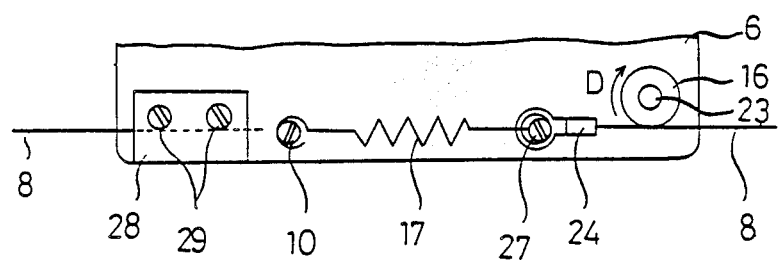
FIG. 5 is a detailed view showing a third embodiment of the invention, in which the wire rope is connected to the down section.

In order to install the first and second wire rope 8 and 9, the two ropes are cut to a calculated length, wire terminals are fastened to both ends of the two ropes, and the ropes are respectively looped along desired routes. Because each length of the ropes may be longer than one meter, cutting error in rope length may cause the tension force of the spring to be different from the desired one. FIG. 5 shows an embodiment to make up for this error.

In FIG. 5, one end of the first wire rope 8 is fastened with the wire terminal 24, which is engaged with a screw 27 temporarily set to the first down section 6. Then, looped around the one-way clutch 16 with one or more complete circular loops, the other end of the first wire rope 8 is led back to the first down section 6 through the intermediate pulley 15, the drive pulley 14, the right and left turn pulleys 12 and 11, and then placed between a clamp plate 28 and the first down section 6 to fasten with screws 29. With the other end set in this manner, the total length of the first rope 8 is adjusted for cutting. Finally, one end of the spring 17 is engaged with the screw 10, the other end of the spring 17 with the wire terminal 24, and the temporary screw 27 is removed to complete this setting work. This sequence can eliminate troubles to measure and cut an accurate length of wire rope or chances of tension force of spring to vary with setting of the wire rope, thus allowing for easy and positive setting of wire rope even though each pulley is disposed erroneously.

The aforesaid second and third embodiments shown in FIGS. 4 and 5 can of course apply to a second wire rope as well.

It will be clear to those skilled in the art that various changes may be made in the invention without departing from the spirit and scope thereof, and therefore the invention is not limited by that which is shown in the drawings and described in the specification but only as indicated in the appended claims.

What is claimed is:

1. A drive device comprising:
   (a) a travel assembly which, in use, reciprocates along guide shafts;
   (b) a reversible motor;
   (c) a drive pulley operatively connected to said reversible motor;
   (d) a first pulley;
   (e) a second pulley disposed at a predetermined position such that said second pulley and said first pulley are disposed on opposite sides of said travel assembly;
   (f) a wire-like member extending around said first pulley, said second pulley, and said drive pulley successively; and
   (g) an operating means provided on said travel assembly at a position between said first pulley and said second pulley, said operating means being resiliently connected to one end of said wire-like member to exert an absorbing force on said wire-like member when said travel assembly is moved to cause slack side tension of said wire-like member and to exert a blocking force on said wire-like member when said travel assembly is moved to cause tight side tension of said wire-like member.

2. A drive device according to claim 1 wherein:
   (a) said operating means comprises:
      (i) a third pulley rotatably supported by a one-way clutch on a portion of said travel assembly;
      (ii) a first wire terminal fixably supported by a fixing member on said travel assembly; and
      (iii) a second wire terminal connected to a resilient means for absorbing the elongation or sagging of said wire-like member and
   (b) said one-way clutch is arranged such that, when said third pulley is rotated to cause the slack side tension of said wire-like member, said third pulley is driven in response thereto under the resilience of said resilient means, thereby exerting an absorbing force on said wire-like member, but, when said third pulley is rotated to cause the tight side tension of said wire-like member, said third pulley is held by said one-way clutch against said tight side tension, thereby exerting a blocking force on said wire-like member.

3. A drive device according to claim 2 wherein:
   (a) said first wire terminal is fixably supported to allow the length of said wire-like member to be adjustable;
   (b) said resilient means is detachably engaged between said second wire terminal and a fixed portion on said travel assembly; and
   (c) said device further comprises a detachably fixing means for fixing said second wire terminal to said travel assembly.

4. A drive device according to claim 3 wherein:
   (a) said device comprises a pair of parallel wire-like members and a pair of operating means and
   (b) each one of said pair of wire-like members is trained over said first pulley and is connected to said travel assembly by a corresponding one of said pair of operating means.

5. A drive device according to claim 1 wherein said first pulley serves as a driving pulley.

6. A drive device according to claim 5 wherein:
   (a) said device comprises a pair of parallel wire-like members and a pair of operating means and
   (b) each one of said pair of wire-like members is trained over said first pulley and is connected to said travel assembly by a corresponding one of said pair of operating means.

7. A drive device according to claim 1 wherein said second pulley serves as a driving pulley.

8. A drive device according to claim 7 wherein:
   (a) said device comprises a pair of parallel wire-like members and a pair of operating means and
   (b) each one of said pair of wire-like members is trained over said first pulley and is connected to said travel assembly by a corresponding one of said pair of operating means.

9. A drive device according to claim 1 wherein:
   (a) said device comprises a pair of parallel wire-like members and a pair of operating means and
   (b) each one of said pair of wire-like members is trained over said first pulley and is connected to said travel assembly by a corresponding one of said pair of operating means.

10. A drive device according to claim 1 wherein:
    (a) said first pulley is positioned beyond the end point of movement of where said travel assembly is connected to said wire-like member in a direction towards said second pulley and
    (b) said second pulley is positioned beyond the end point of movement where said travel assembly is connected to said wire-like member in a direction toward said first pulley.

11. A drive device according to claim 1 wherein:
    (a) said operating means comprises:
       (i) a pair of pulleys;
       (ii) a pair of one-way clutches arranged on said travel assembly, each one of said pair of one-way clutches being associated with a corresponding one of said pair of pulleys; and
       (iii) a wire terminal connected to each end of a resilient means for absorbing the elongation or sagging of said wire-like member and
    (b) said pair of one-way clutches are arranged such that, when one of said pair of pulleys is rotated to cause the slack side tension of said wire-like member, said one of said pair of pulleys is driven in response thereto under the resilience of said resilient means, thereby exerting an absorbing force on said wire-like member, but, when said one of said pair of pulleys is rotated to cause the tight side tension of said wire-like member, said one of said pair of pulleys is held by one of said pair of one-way clutches against said tight side tension, thereby exerting a blocking force on said wire-like member.

* * * * *